United States Patent
Noh et al.

(10) Patent No.: US 9,339,163 B2
(45) Date of Patent: May 17, 2016

(54) MOBILE ROBOT AND OPERATING METHOD THEREOF

(71) Applicant: LG ELECTRONICS INC., Seoul (KR)

(72) Inventors: Dongki Noh, Seoul (KR); Seungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/529,742

(22) Filed: Oct. 31, 2014

(65) Prior Publication Data

US 2015/0157182 A1 Jun. 11, 2015

(30) Foreign Application Priority Data

Oct. 31, 2013 (KR) .......................... 10-2013-0131621

(51) Int. Cl.
*A47L 11/40* (2006.01)
*G05D 1/02* (2006.01)

(52) U.S. Cl.
CPC ......... *A47L 11/4061* (2013.01); *A47L 11/4011* (2013.01); *G05D 1/0231* (2013.01); *G05D 1/0274* (2013.01); *G05D 2201/0215* (2013.01)

(58) Field of Classification Search
CPC ........... A47L 11/4061; A47L 11/4011; G05D 1/0231; G05D 1/0274

USPC ............................................................ 701/28
See application file for complete search history.

(56) References Cited

U.S. PATENT DOCUMENTS

| 5,682,313 A | * | 10/1997 | Edlund et al. | ................. 342/127 |
| 2005/0000543 A1 | | 1/2005 | Taylor et al. | |
| 2012/0106829 A1 | * | 5/2012 | Lee et al. | ...................... 382/153 |
| 2012/0271502 A1 | * | 10/2012 | Lee et al. | ........................ 701/26 |

FOREIGN PATENT DOCUMENTS

KR 10-2012-0126771 A 11/2012

OTHER PUBLICATIONS

European Search Report dated Jul. 30, 2015 issued in Application No. 14191327.7.

* cited by examiner

*Primary Examiner* — Rodney Butler
*Assistant Examiner* — Anne Mazzara
(74) *Attorney, Agent, or Firm* — KED & Associates, LLP

(57) ABSTRACT

Data within a designated distance from a main body of the mobile robot is accumulated and stored to form a local area map. A traveling direction or a rotating direction is set while avoiding an obstacle around the main body and a path may be readily set. Repetition of unnecessary operation is prevented and thus a traveling velocity based on rapid movement may be improved. Obstacles are readily avoided and cleaning efficiency may be improved.

12 Claims, 11 Drawing Sheets

MOBILE ROBOT AND OPERATING METHOD THEREOF

CROSS-REFERENCE TO RELATED APPLICATION

This application claims priority under 35 U.S.C. §119 to Korean Patent Application No. 10-2013-0131621, filed on Oct. 31, 2013 in the Korean Intellectual Property Office, whose entire disclosure is incorporated herein by reference.

BACKGROUND

1. Field

The present disclosure relates to a mobile robot and an operating method thereof.

2. Background

A mobile robot is an apparatus which autonomously travels about an area to be cleaned and sucks in foreign substances, such as dust, from the floor to automatically clean the area. The mobile robot has a rechargeable battery, freely moves using operating power of the battery, and if needed, returns to a charging station so as to recharge the battery.

In general, such a mobile robot performs an obstacle avoidance operation by sensing a distance from a piece of furniture, office supplies, and/or a wall, etc., within a cleaning area, and controlling a drive to a left wheel and a right wheel. The mobile robot measures a moving distance through a sensor observing a ceiling or a floor or includes obstacle sensors. As the obstacle sensor, an ultrasonic sensor or an infrared sensor is used.

If such a sensor is used, some degree of accuracy in sensing whether or not there is an obstacle in the direction of a traveling path is possible, but reliable accuracy in sensing a distance from an obstacle or sensing a floor condition in a cleaning area, such as a cliff or a steep drop (e.g., stairs), may not be accurately detected and an error due to such distance recognition occurs. Even if the mobile robot generates a map and travels based on the map, the mobile robot does not store data regarding a path through which the mobile robot has passed and does not cope with sudden path change.

BRIEF DESCRIPTION OF THE DRAWINGS

The embodiments will be described in detail with reference to the following drawings in which like reference numerals refer to like elements wherein.

DETAILED DESCRIPTION

Figure 1:
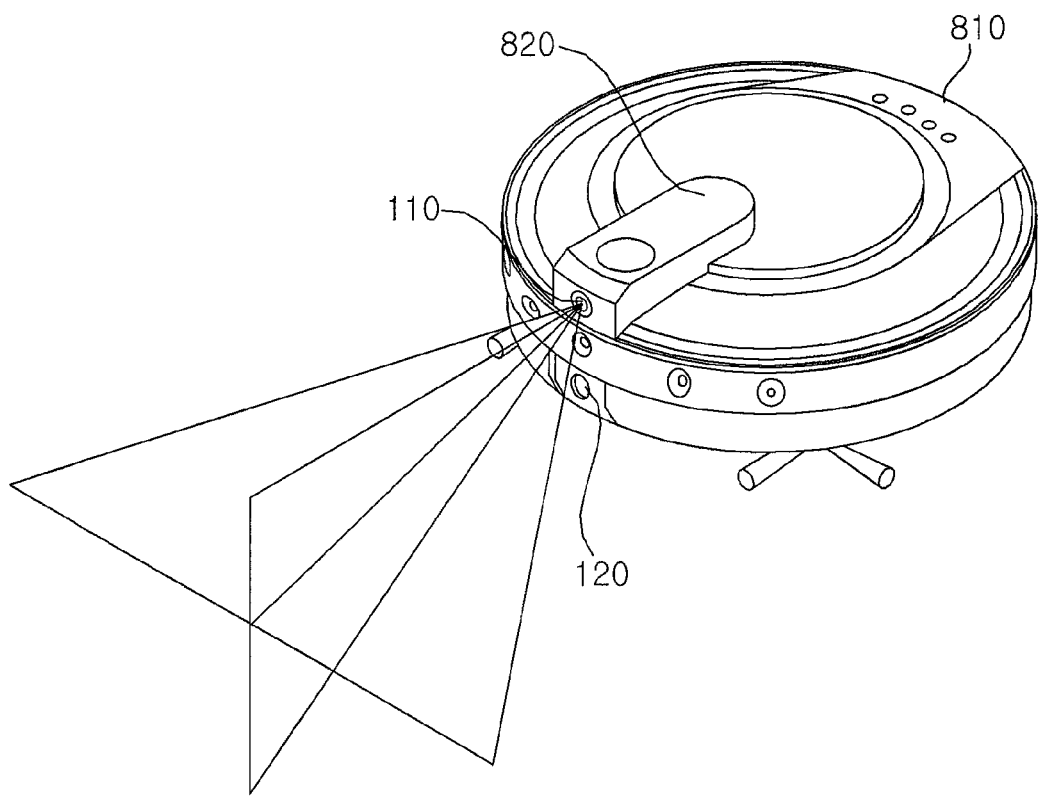
FIG. 1 is a perspective view illustrating a mobile robot in accordance with one embodiment of the present disclosure.
Figure 2:
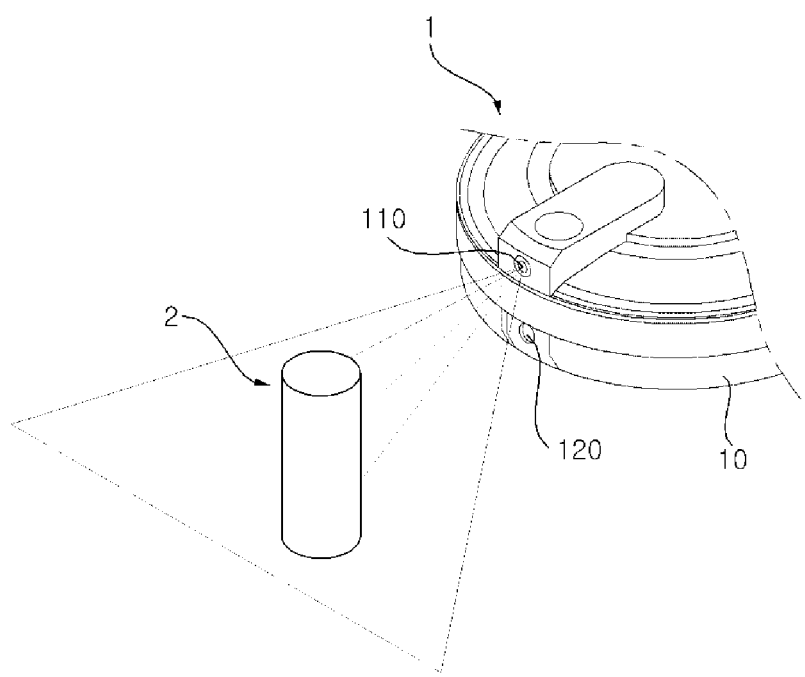
FIG. 2 is a view schematically illustrating an obstacle sensing configuration of a mobile robot in accordance with one embodiment of the present disclosure.

FIG. 1 is a perspective view illustrating a mobile robot in accordance with one embodiment of the present disclosure and FIG. 2 is a view schematically illustrating an obstacle sensing configuration of a mobile robot in accordance with one embodiment of the present disclosure. A mobile robot 1 in accordance with one embodiment of the present disclosure may include a mobile main body 10, an optical pattern sensor 100, and a controller (not shown). The optical pattern sensor 100 includes a pattern irradiation unit 110 emitting the optical pattern and a pattern image acquisition unit 120 photographing an area to which the optical pattern is emitted. Further, the mobile robot 1 may include an input unit 810 and an output unit 820.

The pattern irradiation unit 110 may include a light source and an optical pattern projection element (OPPE). Light incident from the light source is projected on the OPPE, thus generating the optical pattern. The light source may be a laser diode (LD) or a light emitting diode (LED). Laser light has greater monochromaticity, straightness, and connectivity than other light sources and may thus precisely measure distance. Infrared light or visible light causes a large deviation in precision of measurement of a distance from a target object due to factors such as a color or a material of the target object and thus the laser diode may be used as the light source. The OPPE may include a lens, a mask, or a diffractive optical element (DOE).

The pattern irradiation unit 110 may emit light to an area in front of the main body 10. Particularly, an emission direction of the optical pattern may be a slightly downward direction so that the optical pattern may be emitted to the floor in an active area of the mobile robot 1. The pattern image acquisition unit 120 acquires an input image by photographing the area to which the optical pattern is emitted. The pattern image acquisition unit 120 may include a camera, and such a camera may be a structured light camera. The camera may obtain depth or surface information of the object in the acquired image based on structured light emitted on the object.

The mobile robot 1 performs cleaning by sucking in dust or foreign substances around the mobile robot 1 while moving in a designated area. The mobile robot 1 sets a cleaning area according to operation of a button provided on the input unit 810 and performs traveling or cleaning according to setup.

The mobile robot 1 may receive various control instructions required to operate the mobile robot 1 through the input unit 810. The output unit 820 displays a cleaning method or a traveling method, such as reservation information, a battery state, concentrated cleaning, space extension, and zigzag-type driving. The output unit 820 may output operating states of the respective units forming the mobile robot 1.

Further, the mobile robot 1 is equipped with a battery (not shown), performs traveling and cleaning using operating power of the battery, and, if the remaining amount of power of the battery is insufficient, returns to a charging station (not shown) so as to recharge the battery. The main body 10 of the mobile robot 1 moves to an area to be cleaned (a cleaning area) through a traveling unit (not shown) and sucks foreign substances, such as dust and/or dirt, into the cleaning unit through a suction unit provided on a cleaning unit (not shown).

The mobile robot 1 senses an obstacle in a moving direction through the optical pattern sensor 100, sets a moving path so as to avoid the obstacle, and reaches a target position along the moving path. The optical pattern sensor 100 emits an optical pattern to an active area in which the mobile robot 1 is operated, and acquires an input image by photographing the area to which the optical pattern is emitted. The optical pattern may include at least one cross-shaped pattern. The optical pattern sensor 100 senses an obstacle 2 using a cross-shaped pattern.

Hereinafter, marks, such as points, straight lines and curved lines forming the pattern, are defined as pattern descriptors. Based on such a definition, a cross-shaped pattern includes two pattern descriptors of a horizontal line and a vertical line intersecting the horizontal line. Since the horizontal line serves to recognize an obstacle condition of a wide range and the vertical line is set to only a degree required to move the mobile robot, the length of the horizontal line of the cross-shaped pattern may be greater than the length of the vertical line. Further, several combinations of horizontal lines and vertical lines may be provided and the optical pattern may be a pattern including one horizontal line and a plurality of vertical lines intersecting the horizontal line or vice versa.

Figure 3:
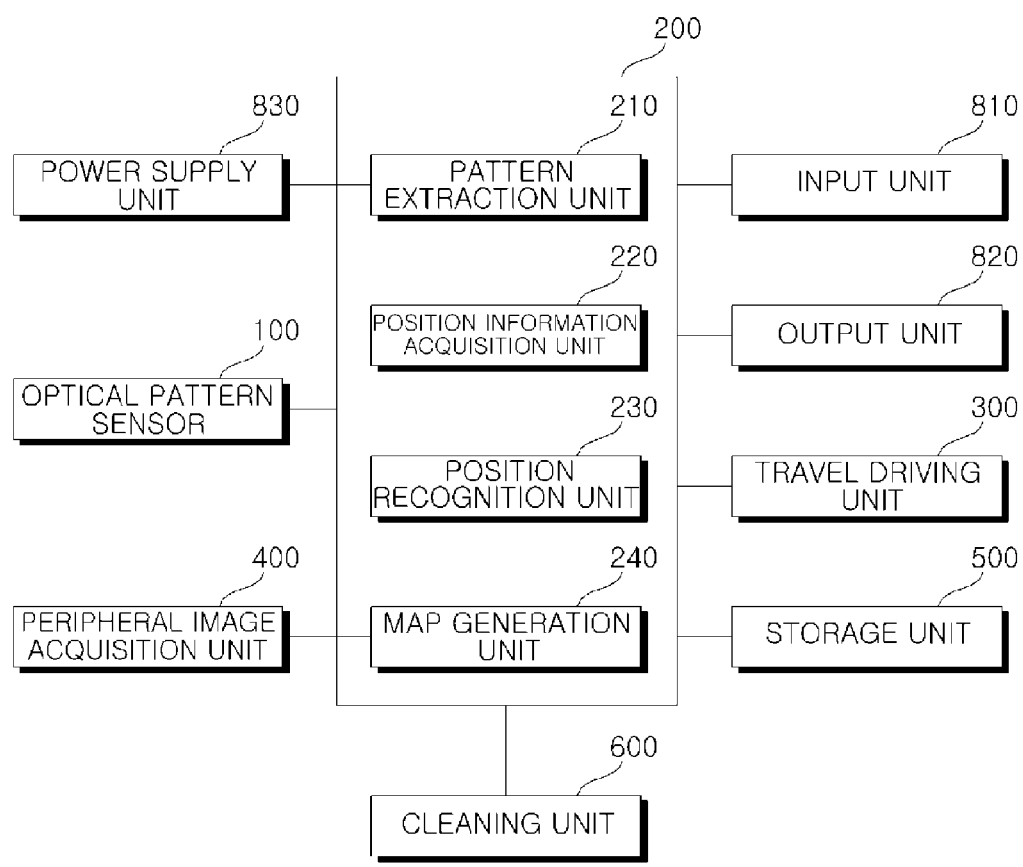
FIG. 3 is a block diagram schematically illustrating the configuration of a mobile robot in accordance with one embodiment of the present disclosure.

FIG. 3 is a block diagram schematically illustrating the configuration of a mobile robot in accordance with one embodiment of the present disclosure. The mobile robot 1 further includes an optical pattern sensor 100, a controller 200, a power supply unit 830, a peripheral image acquisition unit 400, a cleaning unit 600, an input unit 810, an output unit 820, a travel driving unit 300, and a storage unit 500. The controller 200 also includes a pattern extraction unit 210, a position information acquisition unit 220, a position recognition unit 230, and a map generation unit 240.

The pattern extraction unit 210 may compare brightness of points in the input image sequentially in the vertical direction and define the points that are brighter than the peripheral surroundings by a designated level or more as candidate points. The pattern extraction unit 210 thereafter may define a line, on which these candidate points are arranged in the vertical direction, as a vertical line.

Thereafter, the pattern extraction unit 210 detects a cross-shaped pattern descriptor formed by a vertical line and a line extending from the vertical line in the horizontal direction, among lines formed by the candidate points of the input image. The cross-shaped pattern descriptor need not be the entirety of a cross-shaped pattern. Since a vertical line pattern and a horizontal line pattern are modified according to the shape of a target object to which the optical pattern is emitted, although the shape of the pattern in the input image may be irregular and the size of a portion of the pattern at which the vertical line and the horizontal line intersect may be varied according to the shape of the target object, a '+'-shaped pattern descriptor is present at all times. Hence, the pattern extraction unit 210 may detect a pattern descriptor, corresponding to the shape of a template to be acquired, from the input image and define an overall pattern including the pattern descriptor. In case of a cross-shaped optical pattern, the template has a '+' shape.

The position information acquisition unit 220 may acquire position information, such as the width and height of an obstacle or a distance from the obstacle, based on the pattern defined by the pattern extraction unit 210. Since the emission direction of the pattern irradiation unit 110 is fixed, when the optical pattern is emitted to an area in which there is no obstacle, the position of the pattern in the input image is regular at all times. Hereinafter, the input image in this case is defined as a reference input image.

Position information of the pattern in the reference input image may be calculated in advance based on triangulation. Assuming that coordinates of a random pattern descriptor Q forming a pattern in the reference input image are set to Q(Xi, Yi), a distance value Li(Q) from the emitted optical pattern to a position corresponding to the pattern descriptor Q may be known in advance based on triangulation.

The coordinates Q'(Xi', Yi') of the pattern descriptor Q in an input image acquired by emitting the optical pattern to an area in which there is an obstacle are moved from the coordinates Q(Xi, Yi) of the pattern descriptor Q in the reference input image. The position information acquisition unit 220 may acquire position information, such as the width and height of the obstacle or a distance from the obstacle by comparing the coordinates Q and Q'.

For example, the width and shape of the obstacle or a distance from the obstacle may be detected according to the bending angle or degree of the horizontal line of the cross-shaped pattern and the height of the obstacle may be detected through a vertical displacement of the horizontal line or the length of the vertical line. Further, the distance from the obstacle may also be detected based on a displacement of the vertical line. If the horizontal line pattern alone is used, the recognizable height of the obstacle may be restricted and the position information of the obstacle may be mis-recognized. Thus, a cross-shaped pattern including horizontal and vertical lines may increase measurement precision.

The position recognition unit 230 may extract feature points from an image acquired by the peripheral image acquisition unit 400 and recognize the position of the mobile robot 2 based on the feature points. Further, the map generation unit 240 may generate a peripheral map, i.e., a map of a cleaning space based on the position recognized by the position recognition unit 230. The map generation unit 240 may generate a peripheral map in which an obstruct condition is reflected, in cooperation with the position information acquisition unit 220.

The travel driving unit 300 moves the main body 10. The controller 20 may control the travel driving unit 300 according to position information acquired by the position information acquisition unit 220 so as to perform various traveling modes, such as avoiding obstacles, overcoming obstacles, and stopping.

The travel driving unit 300 may include a wheel motor driving at least one wheel installed on the lower portion of the main body 10 and move the main body 10 according to a driving signal. The mobile robot may include left and right driving wheels. A pair of wheel motors may be provided to rotate the left and right driving wheels. These wheel motors are driven independently of each other and the mobile robot 1 may change direction according to rotating directions of the left driving wheel and the right driving wheel. Further, the mobile robot 1 may further include a subsidiary wheel supporting the main body 10, in addition to the driving wheels. Thereby, friction between the lower surface of the main body 10 and the floor may be minimized and the mobile robot 1 may smoothly move.

The peripheral image acquisition unit 400 may include at least one camera installed so as to face the top or the front.

The storage unit 500 may store input images acquired by the pattern image acquisition unit 120, position information of an obstacle acquired by the position information acquisition unit 220, and a peripheral map generated by the map generation unit 240. The storage unit 500 may also store a control program driving the mobile robot and data acquired there through. The storage unit 500 mainly uses a non-volatile memory (NVM or NVRAM). The non-volatile memory retains stored information even if power is not supplied thereto. Non-volatile memories may include a ROM, a flash memory, a magnetic recording medium (for example, a hard disk, a floppy disk drive, or a magnetic tape), an optical disc drive, a magnetic RAM, a PRAM, etc.

The cleaning unit 600 sucks in dust or foreign substances around the mobile robot 1. The cleaning unit 600 may include a dust case storing collected dust, a suction fan providing force to suck in dust from a cleaning area, and a suction motor rotating the suction fan to suck in dust. The cleaning unit 600 may include a rotary brush rotated under the main body 10 about a horizontal axis to agitate dust on the floor or a carpet into air, and a plurality of blades may be provided on the outer surface of the rotary brush in a spiral direction. Further, the mobile robot 1 may further include side brushes rotated about a vertical axis to clean a wall, a corner, etc., and the side brushes may be provided between the blades.

The input unit 810 may include one or more input devices, as described above, and receive various control instructions required to operate the mobile robot. For example, the input unit 810 may include a confirmation button, a setup button, a reservation button, a recharge button, etc. The confirmation button may receive instructions to confirm position information of an obstacle, image information, a cleaning area, or a cleaning map. The setup button may receive instructions to set or change a cleaning mode. The reservation button may receive reservation information. The recharge button may receive instructions to return the mobile robot to the charging station for recharging the power supply unit 830. The input unit 810 may include a hard key or a soft key, a touch pad, etc., as input devices. Further, the input unit 810 may be formed as a touch screen having the function of the output unit 820 which will be described below, also.

The output unit 820 displays a cleaning method or a traveling method, such as reservation information, a battery state, concentrated cleaning, space extension, and zigzag-type driving. The output unit 820 may output operating states of the respective units forming the mobile robot. Further, the output unit 820 may display obstacle information, position information, image information, an internal map, a cleaning area, a cleaning map, a designated area, etc. The output unit 820 may include elements, such as a light emitting diode (LED), a liquid crystal display (LCD), a plasma display panel, an organic light emitting diode (OLED), etc.

The power supply unit 830 may supply power to operate the respective units and include a rechargeable battery. The power supply unit 830 supplies not only power to drive the respective units but also operating power to perform traveling and cleaning and, if the remaining amount of power of the battery of the power supply unit 830 is insufficient, the mobile robot moves to the charging station and the battery is recharged. The power supply unit 830 may further include a battery sensing unit to sense the recharge state of the battery. The controller 200 may display the remaining amount of power of the battery or the recharge state of the battery through the output unit 820 based on a sensing result of the battery sensing unit.

Figure 4A:
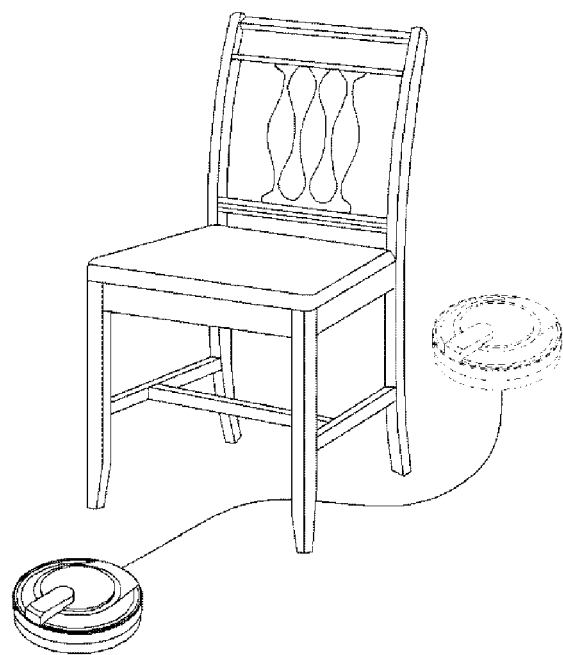
FIGS. 4A to 4C are views illustrating operations performed by a mobile robot in accordance with one embodiment of the present disclosure according to results of detection of an obstacle.
Figure 4B:
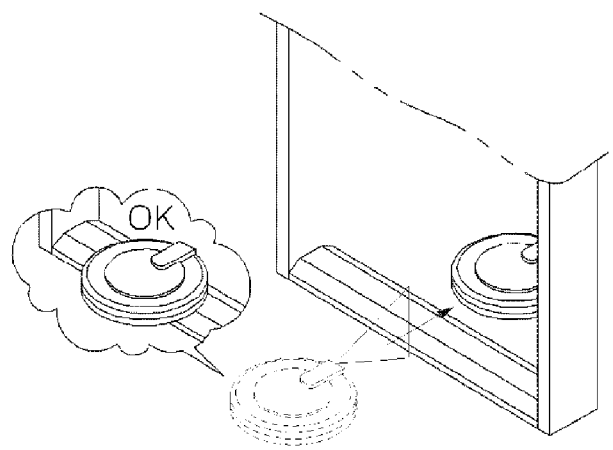
Figure 4C:
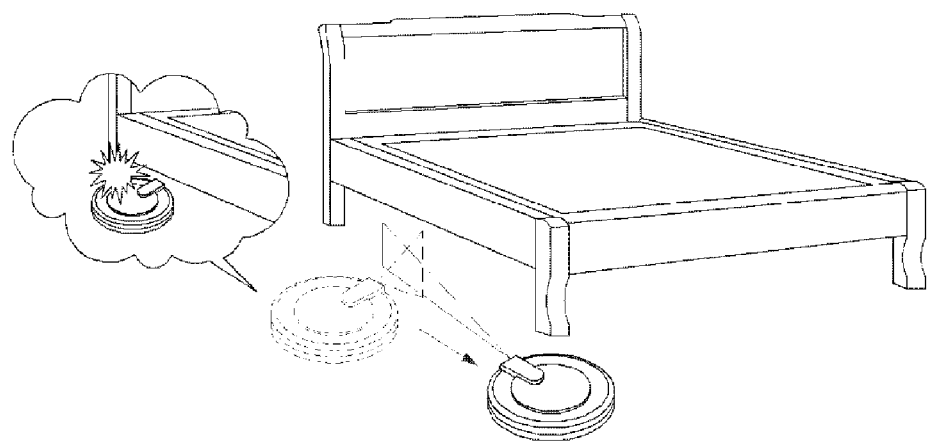

FIGS. 4A to 4C are views illustrating movements of the mobile robot according to kinds of obstacles.

FIG. 4A is a view illustrating movement of the mobile robot if an obstacle is a chair having legs of a designated height or more. The mobile robot may move while avoiding the legs of the chair according to position information of the legs acquired by the position or pattern information acquisition unit 120 (avoidance traveling) and pass through a space under the chair if the height of the legs is greater than the height of the mobile robot (passage traveling).

As exemplarily shown in FIG. 4B, if the height of a threshold acquired by the position or pattern information acquisition unit 120 is low enough to overcome, the mobile robot may move while stepping over the threshold (conquest traveling).

FIG. 4C is a view illustrating movement of the mobile robot if an obstacle is a bed. The mobile robot may recognize the height of a bed frame through the position or pattern information acquisition unit 120 and, as a result of recognition, avoid the bed, if the height of the bed frame is excessively low, and pass through a space under the bed frame if the height of the bed frame is not excessively low.

Figure 5A:
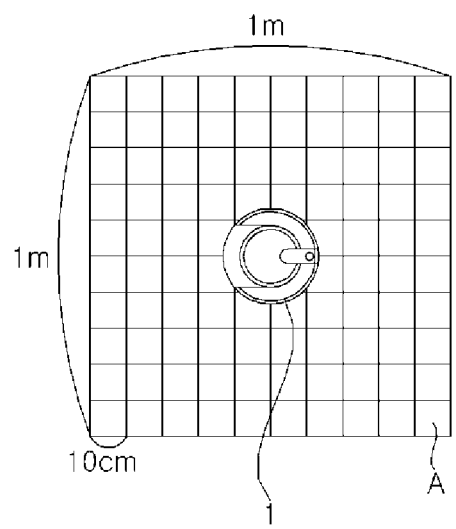
FIGS. 5A to 5C are exemplary views illustrating a local area map of a mobile robot in accordance with one embodiment of the present disclosure.
Figure 5B:
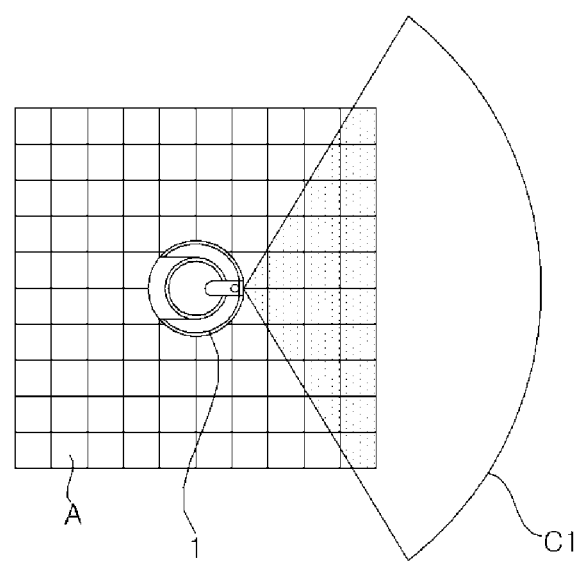
Figure 5C:
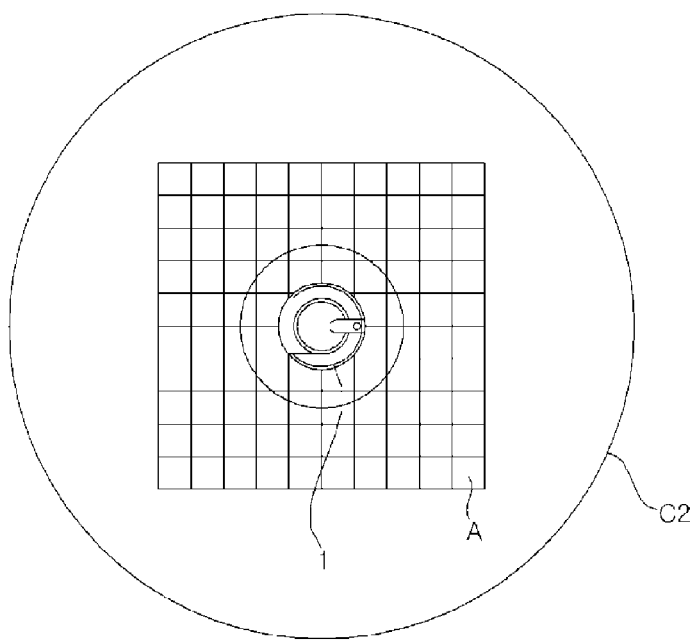

FIGS. 5A to 5C are exemplary views illustrating a local area map of a mobile robot in accordance with one embodiment of the present disclosure. The controller 200 generates a local area map A based on data input from the optical pattern sensor 100, as exemplarily shown in FIG. 5A, and stores the generated local area map A in the storage unit 500.

The controller 200 generates a local area map A with respect to all data within a designated distance from the main body 10 in forward, backward, leftward, and rightward directions, and stores the local area map A. If the main body 10 moves, the controller 200 updates the local area map A with respect to data within the designated distance from the main body 10 by adding new data and deleting unnecessary data according to movement.

For example, the local area map A may be formed to have a distance of about 50 cm in the respective forward and backward directions and a distance of about 50 cm in the respective leftward and rightward directions, i.e., a total size of 1 m×1 m, and include 100 grid cells so that the respective grid cells may be used as coordinates in the local area map A. If there is a specific obstacle within the local area map A, the controller 200 rotates or drives the mobile robot with reference to the local area map A.

As exemplarily shown in FIG. 5B, when information within a sensing area C1 acquired by the optical pattern sensor 100 is input to the controller 110, the pattern extraction unit 210 extracts a pattern from data of the optical pattern sensor 100 based on the input information. The obstacle information acquisition unit 220 senses an obstacle within the sensing area C1 based on the sensed pattern and acquires information regarding the obstacle. The position recognition unit 230 judges the position of the main body 10 and the map generation unit 240 not only generates a map of a cleaning area based on the position of the main body 10 but also generates a local area map A and stores the generated local area map A. The map generation unit 240 does not generate a local area map of the entirety of the sensing area C1 but generates a local area map A with respect to data within a designated distance, as shown in FIG. 5B.

As exemplarily shown in FIG. 5C, the controller 200 controls the travel driving unit 300 to rotate the main body 10 in place one time and thus, sense the overall area C2 of 360 degrees around the main body 10 through the optical pattern sensor 100.

The position recognition unit 230 sets the initial position of the main body 10 to 0 during rotation and then judges the subsequent position of the main body 10 according to movement. The obstacle information acquisition unit 220 senses an obstacle within a sensed area and the map generation unit 240 generates a local area map A based on the sensed obstacle. If the main body 10 moves after initial one rotation, the map generation unit 240 may generate a local area map A in all directions, i.e., forward, backward, leftward, and rightward directions, as shown in FIGS. 5A to 5C.

Figure 6:
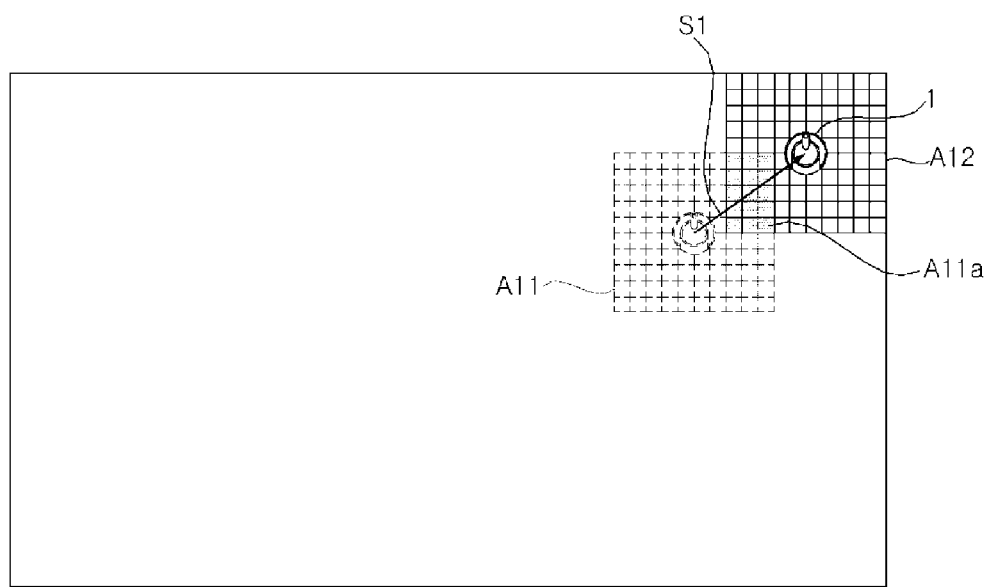
FIG. 6 is an exemplary view illustrating a local area map of a mobile robot in accordance with one embodiment of the present disclosure within a cleaning area.

FIG. 6 is an exemplary view illustrating a local area map of a mobile robot in accordance with one embodiment of the present disclosure within a cleaning area. If the mobile robot 1 travels, the optical pattern sensor 100 inputs sensed information during traveling and thereby, the map generation unit 240 updates the local area map A and then stores the updated local area map A. Since the local area map A stores data of an area around the main body 10, when the mobile robot 1 moves, the area of the local area map A11 prior to movement and the area of the local area map A12 after movement are different.

A common area A11a is formed between the local area map A11 prior to movement and the area of the local area map A12 after movement. The map generation unit 240 retains data regarding the common area A11a and generates the local area map A12 based on new data after movement. The map generation unit 240 adds new data according to a degree of movement and deletes data regarding an area from which the mobile robot 1 has deviated, thus continuously updating the local area map A.

Figure 7:
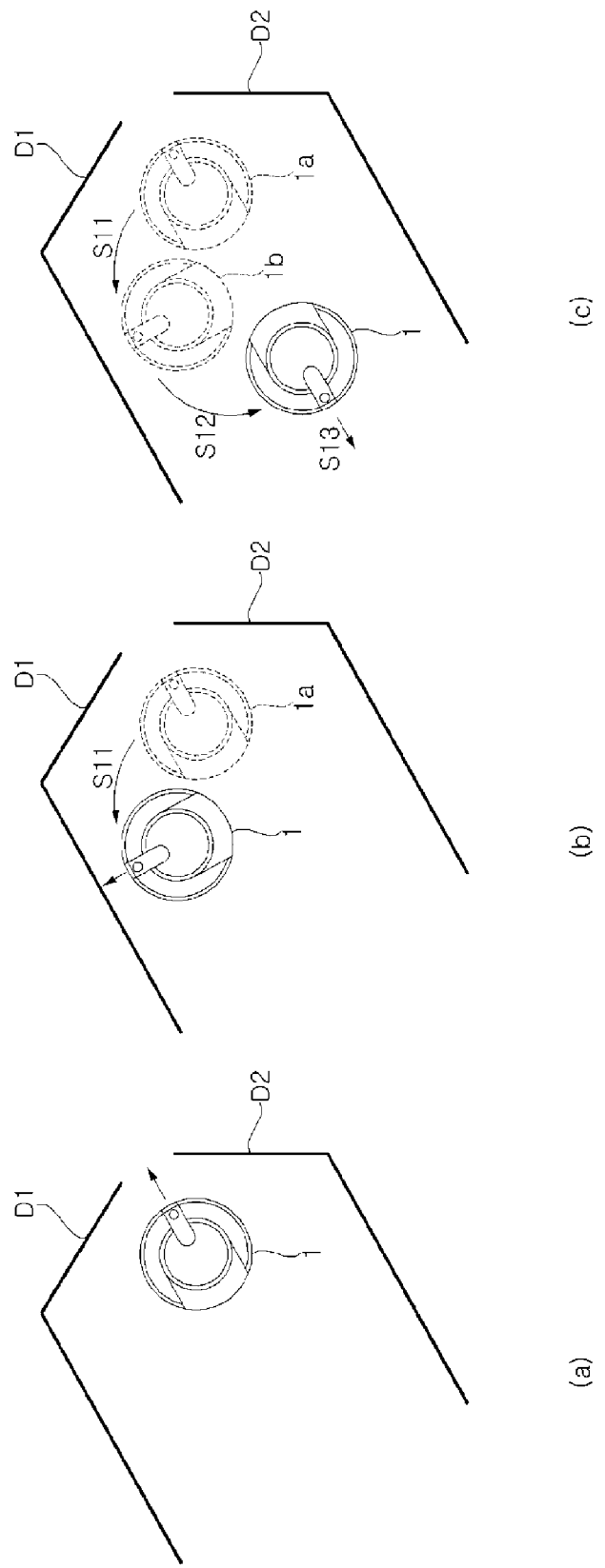
FIG. 7 shows views illustrating an example of traveling and path change of a mobile robot in accordance with one embodiment of the present disclosure.
Figure 8:
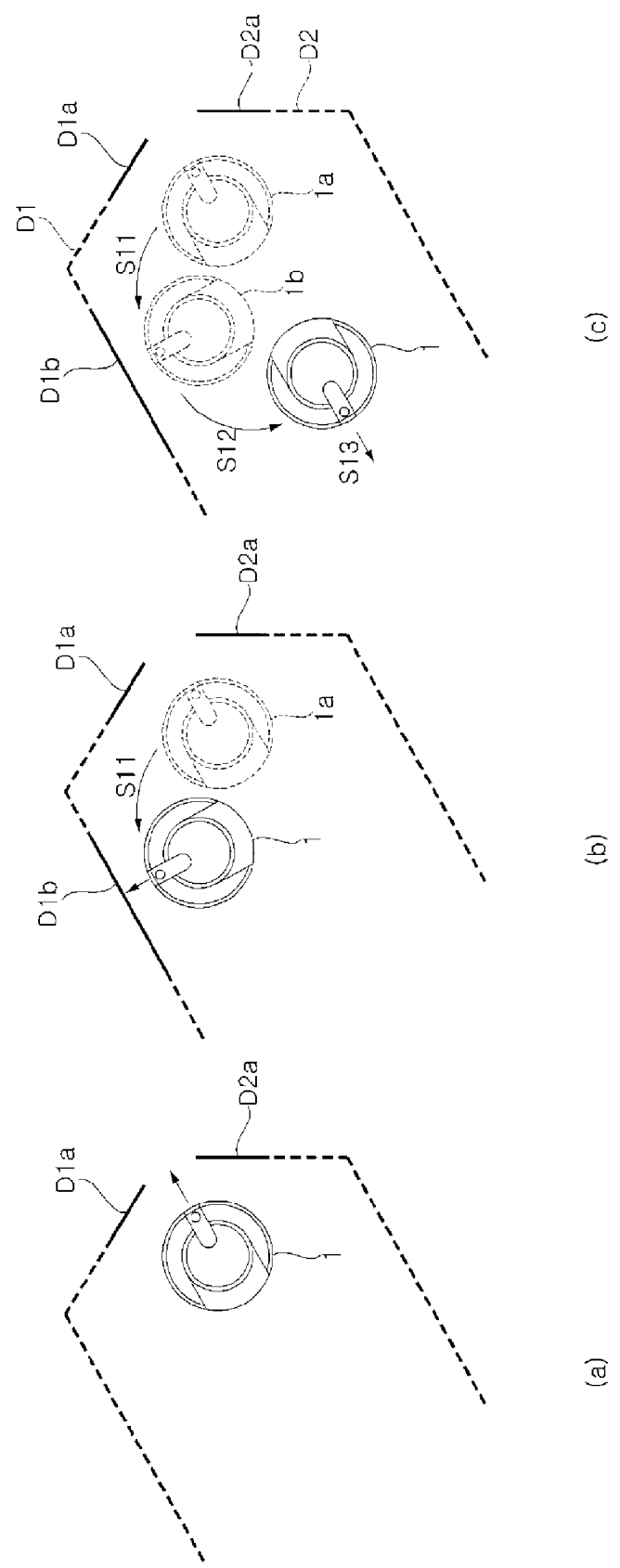
FIG. 8 shows views illustrating an example of obstacle sensing if the mobile robot travels in the manner as in FIG. 7.

FIGS. 7(a) to 7(c) are views illustrating an example of traveling and path change of a mobile robot in accordance with one embodiment of the present disclosure and FIGS. 8(a) to 8(c) are views illustrating an example of obstacle sensing if the mobile robot travels in the manner as in FIGS. 7(a) to 7(c).

As exemplarily shown in FIG. 7(a), the mobile robot 1 travels toward a narrow area in which a first obstacle D1 and a second obstacle D2 are located. For example, the mobile robot 1 may travel to clean an area between the first obstacle D1 and the second obstacle D2.

The mobile robot 1 may sense the first obstacle D1 and the second obstacle D2 and be rotated in one direction, as exemplarily shown in FIG. 7(b), if the mobile robot 1 may no longer travel straight due to the obstacles D1 and D2 (Operation S11).

Since, after rotation, the mobile robot 1 may no longer travel due to the first obstacle D1, the mobile robot 1 may be rotated one more time, as exemplarily shown in FIG. 7(c), (Operation S12) and then travel (Operation S13) to escape from the area between the first obstacle D1 and the second obstacle D2.

If the mobile robot 1 travels about the area between the first obstacle D1 and the second obstacle D2 and senses the first and second obstacles D1 and D2 through the optical pattern sensor 100, as exemplarily shown in FIGS. 7(a) to 7(c), the obstacle information acquisition unit 220 acquires information regarding the first and second obstacles D1 and D2 and the map generation unit 240 stores the information regarding the first and second obstacles D1 and D2 as a local area map A.

The map generation unit 240 stores information regarding only parts of the sensed first and second obstacles D1 and D2, i.e., a first dummy D1a and a second dummy D2a, as the local area map A, as exemplarily shown in FIG. 8(a).

Since the controller 200 may sense the entirety of the first and second obstacles D1 and D2 through the optical pattern sensor 100 but may not store all data, the map generation unit 240 may store only information within a designated distance from the main body 10.

Further, if the mobile robot 1 is rotated, as exemplarily shown in FIG. 7(b), the optical pattern sensor 100 senses the first obstacle D1 in front of the mobile robot 1 and the map generation unit 240 stores new information of a third dummy D1b in the local area map A, as exemplarily shown in FIG. 8(b).

At this time, the map generation unit 240 does not delete, i.e., maintains the information regarding the first and second dummies D1a and D2a located within a designated distance. Thereby, the local area map A does not store information regarding the entirety of the first obstacle D1 and the second obstacle D2 but stores information regarding parts of the first and second obstacles D1 and D2, i.e., information regarding the first to third dummies D1a, D2a, and D1b and thus, the controller 200 sets a traveling direction or a path of the mobile robot 1 based on the local area map A.

Since the local area map A includes the information regarding the first and second dummies D1a and D2a, and if the mobile robot 1 is rotated, as exemplarily shown in FIG. 7(c), the controller 200 controls the travel driving unit 300 so that the mobile robot 1 is rotated leftward rather than rightward.

As exemplarily shown in FIG. 8(c), information regarding the first to third dummies D1a, D2a, and D1b sensed at a first position 1a and a second position 1b of the mobile robot 1 is stored in the local area map A and maintained. When the mobile robot 1 is separated from the obstacles D1 and D2 by a designated distance, the mobile robot 1 deviates from the range of the local area map A and the map generation unit 240 deletes the information regarding the first to third dummies D1a, D2a, and D1b and stores new information as the local area map.

Figure 9:
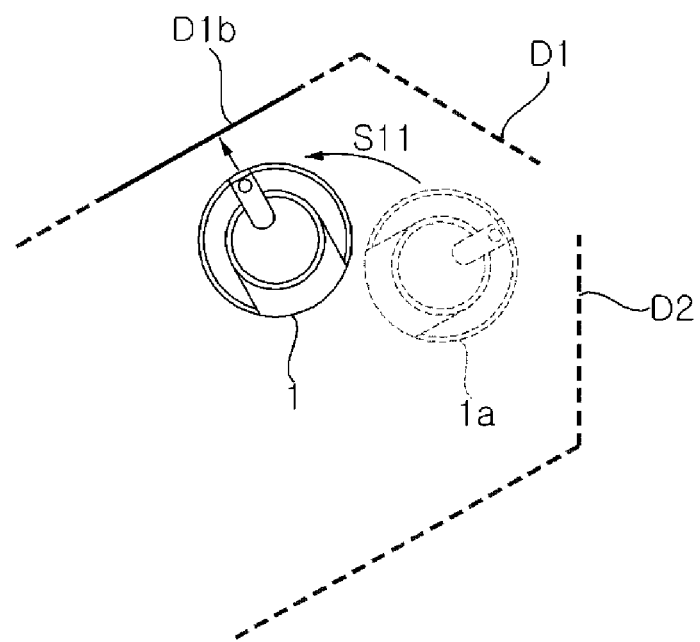
FIG. 9 is a view illustrating a result of obstacle sensing if a conventional mobile robot travels as in the manner shown in FIG. 7.

FIG. 9 is a view illustrating a result of obstacle sensing if a related art mobile robot travels as in the manner shown in FIGS. 7(a) to 7(c). The mobile robot stores and maintains only information based on a traveling direction and deletes information regarding obstacles located on a path through which the mobile robot has passed.

After first rotation of the mobile robot 1 shown in FIG. 7(b) (Operation S11), the mobile robot deletes information regarding the first and second dummies D1a and D2a, which is not included in a subsequent traveling path or traveling direction, and stores only information regarding the third dummy D1b.

In this case, during second rotation of the mobile robot 1 (Operation S112), the conventional mobile robot may be rotated in one direction of leftward and rightward direction and, when the conventional mobile robot is rotated rightward, the mobile robot senses the first and second dummies D1a and D2a again after rotation and thus repeats rotation.

On the other hand, since the mobile robot 1 in accordance with the embodiment of the present disclosure does not store only data in a traveling direction or on a traveling path but stores data around the main body 10 as a local area map A even if the data is not related to the traveling direction, as exemplarily shown in FIGS. 8(a) to 8(b), if the mobile robot 1 suddenly changes the traveling direction or is rotated, the mobile robot 1 may determine a rotating direction with reference to the local area map.

Figure 10:
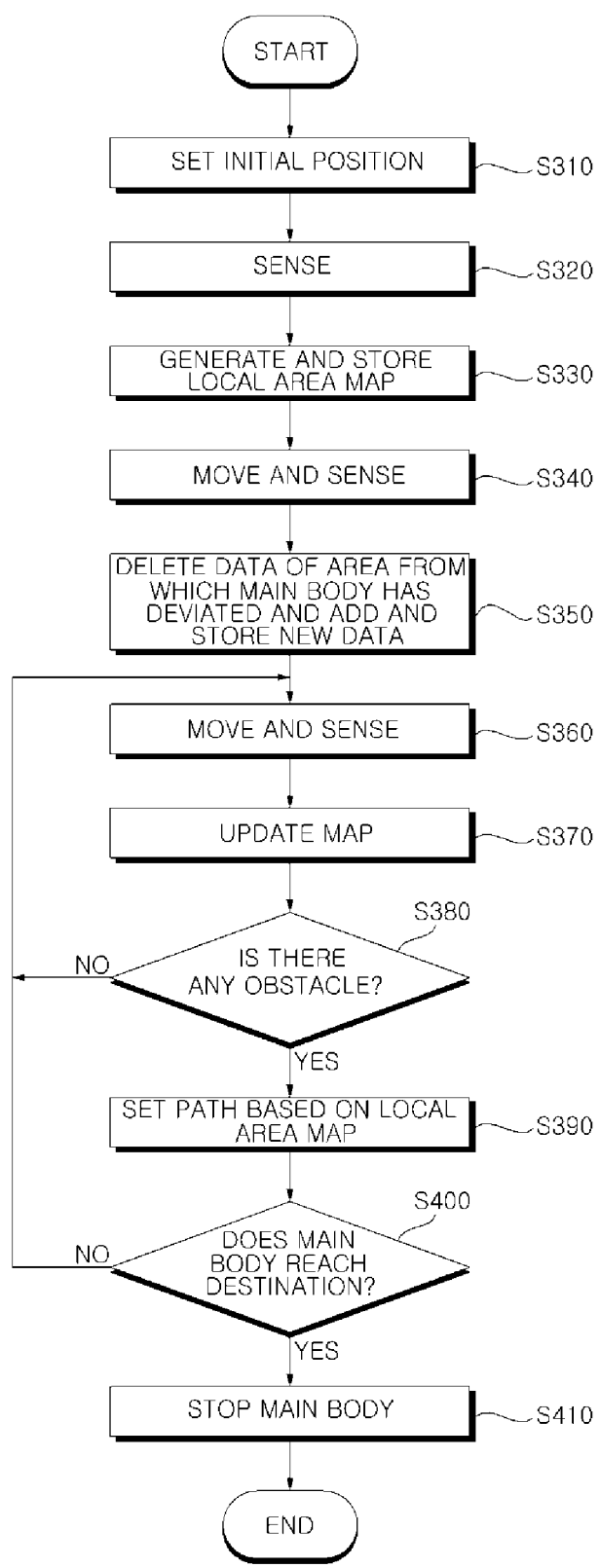
FIG. 10 is a flowchart illustrating an operating method of a mobile robot in accordance with one embodiment of the present disclosure.

FIG. 10 is a flowchart illustrating an operating method of a mobile robot in accordance with one embodiment of the present disclosure. With reference to FIG. 10, when the traveling or cleaning operation of the mobile robot 1 is set, the controller 200 sets the current position of the mobile robot 1 as an initial position (Operation S310).

The optical pattern sensor 100 senses an environment around the mobile robot 1 (Operation 320) and the map generation unit 240 generates a local area map A based on a sensed obstacle and the position thereof (Operation S320) and stores the generated local area map A in the storage unit 500 (Operation S330). The map generation unit 240 generates the local area map A using only information within a set distance from the main body 10 rather than the entirety of a sensed area.

The pattern extraction unit 210 extracts a pattern from the data sensed by the optical pattern sensor 100, the obstacle information acquisition unit 220 recognizes the obstacle according to the pattern and acquires information regarding the obstacle, and the position recognition unit 230 calculates position information of the main body 10. The map generation unit 240 may generate the local area map A based on the data sensed and judged by the pattern extraction unit 210, the obstacle information acquisition unit 220, and the position recognition unit 230.

The controller 200 controls the travel driving unit 300 so as to move the main body 10 to a set destination or according to a designated cleaning mode. The travel driving unit 300 travels according to control instructions from the controller 200 and the optical pattern sensor 100 senses a traveling direction during traveling and inputs the sensed traveling direction to the controller 200 (Operation S340).

The pattern extraction unit 210, the obstacle information acquisition unit 220, and the position recognition unit sense an obstacle located in the traveling direction according to the data sensed by the optical sensor 100 during traveling, judges the position of the obstacle, and extracts the position of the mobile robot 1.

The map generation unit 240 adds new data to the local area map A or deletes existing data based on data newly input according to movement of the mobile robot 1, thus updating the local area map A (Operation S350). The map generation unit 240 updates the local area map A while retaining data regarding a common area between an area prior to movement and an area after movement, as described above with reference to FIG. 6.

During traveling, the controller 200 may travel and avoid obstacles by not only storing the local area map A but also separately storing data of a long distance sensed by the optical pattern sensor 100.

Since the mobile robot 1 continues traveling until the mobile robot 1 reaches a destination and during cleaning, continues movement and cleaning until cleaning has been completed, the optical pattern sensor 100 continues sensing of an environment around the main body 10 according to movement of the main body 10 (Operation S360). Thereby, the map generation unit 240 updates the local area map A based on new data (Operation S370).

When an obstacle is sensed (Operation S380), the controller 200 changes the traveling direction or the traveling path so as to avoid the obstacle. If the controller 200 changes the traveling direction so as to avoid the obstacle, the controller 200 sets a new traveling direction or a rotating direction with reference to the local area map A (Operation S390).

The controller 200 determines the rotating direction or the traveling direction by judging whether or not there is an obstacle around the main body 10 based on the local area map A. In the above-described case shown in FIGS. 7(b) and 8(b), the controller 200 controls the travel driving unit 300 so as to rotate the main body 10 leftward.

If an obstacle is located at a long distance deviating from the local area map A and the main body 10 simply moves, the controller 200 may change the traveling path so that the main body 10 may avoid the obstacle before the main body 10 reaches the obstacle.

The controller 200 avoids the obstacle and travels to the destination by repeating environment sensing using the optical pattern sensor 100 and update of the local area map A until the main body 200 reaches the destination.

When the main body 10 reaches the destination (Operation S400), the controller 200 controls the travel driving unit 300 so as to stop the main body 10 and the mobile robot 1 stops at the destination (Operation S410).

Data of an environment around the main body of the mobile robot within a designated distance from the main body is stored as a local area map and thus, if the traveling direction of the main body is suddenly changed or the main body is rotated, a new traveling direction of the main body may be determined with reference to the local area map. Thereby, repetition of unnecessary operation may be prevented and a path may be readily set.

Although the embodiment of the present disclosure describes all elements as being combined into one unit or being operated together, embodiments of the present disclosure are not limited thereto. That is, according to embodiments, all elements may be selectively combined into one or more units within the scope of the disclosure.

Further, all elements may be respectively implemented as independent hardwares, or some or all of the respective elements may be selectively combined and implemented as a computer program having a program module performing the functions of the combined some or all elements in one hardware or a plurality of hardwares.

In a mobile robot and an operating method thereof in accordance with the present disclosure, data around a main body of the mobile robot is stored as a local area map and thus, if the traveling direction of the main body is suddenly changed or the main body is rotated, the mobile robot may set a new traveling direction or a rotating direction while avoiding an obstacle around the main body with reference to the local area map and thus readily set a path, prevent repetition of unnecessary operation and thus improve a traveling velocity based on rapid movement, and easily avoid the obstacle and thus improve cleaning efficiency.

A mobile robot stores data within a designated distance from the mobile robot and travels based on the stored data.

A mobile robot includes a mobile main body, an optical pattern sensor sensing obstacles around the main body, a cleaning unit sucking in foreign substances around the main body during traveling, a controller extracting information of the obstacles by analyzing data input from the optical pattern sensor, setting a traveling direction or a traveling path so as to avoid the obstacles, and thus controlling the main body so as to travel to a destination while avoiding the obstacles, and a travel driving unit moving the main body according to control instructions from the controller, wherein the controller includes an obstacle information acquisition unit judging the obstacles and calculating the positions of the obstacles from data from the optical pattern sensor and a map generation unit generating a local area map of an environment around the main body based on the information of the obstacles calculated by the obstacle information acquisition unit.

An operating method of a mobile robot includes sensing an environment around a main body of the mobile robot through an optical pattern sensor, when an operation mode is set, generating a local area map of the environment around the main body based on data input from the optical pattern sensor, updating the local area map according to data input from the optical pattern sensor during traveling according to the operation mode, and controlling the main body to change a traveling direction so as to avoid an obstacle around the main body based on the local area map, when the obstacle is sensed.

This application is related to U.S. application Ser. No. 14/529,774 filed on Oct. 31, 2014, whose entire disclosure is incorporated herein by reference.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot comprising:
   a mobile main body;
   an optical pattern sensor configured to sense obstacles around the main body;
   a suction motor configured to suck in foreign substances around the main body during traveling;
   a controller configured to extract information of the obstacles by analyzing data input from the optical pattern sensor, to set at least one of a traveling direction or a traveling path so as to avoid the obstacles, and to control the main body so as to travel to a destination while avoiding the obstacles; and
   a motorized wheel configured to move the main body according to control instructions from the controller,
   wherein the controller includes:
     an obstacle information acquisition unit configured to judge the obstacles and to calculate the positions of the obstacles from data from the optical pattern sensor; and
     a map generation unit configured to generate a plurality of local area maps, each map including information of obstacles located within a designated distance from the main body, based on the information of the obstacles calculated by the obstacle information acquisition unit,
   wherein when the main body moves from a first area of a first local area map to a second area of a second local area map, the map generation unit generates the second local area map by retaining data regarding a common area from the first local area map prior to movement and the second local area map after movement, adding new data after movement, and deleting data prior to movement.

2. The mobile robot according to claim 1, wherein the map generation unit generates the plurality of local area maps including information located within a designated distance from the main body in forward, backward, leftward, and rightward directions.

3. The mobile robot according to claim 1, wherein the map generation unit generates the plurality of local area maps with respect to an area of a lateral distance of 1 m and a longitudinal distance of 1 m based on information located within a distance of 50 cm in respective forward and backward directions and a distance of 50 cm in respective leftward and rightward directions.

4. The mobile robot according to claim 1, wherein the controller controls the motorized wheel so that the main body is rotated while avoiding the obstacles within a local area map with reference to a local area map during change of the traveling direction or rotation of the main body.

5. The mobile robot according to claim 1, wherein the controller sets a position of the main body prior to movement as an initial position of 0 and controls the motorized wheel so that the main body is rotated one time in place and then starts to travel.

6. The mobile robot according to claim 5, wherein when the initial position of the main body is set, the map generation unit generates at least one of the local area maps based on data input from the optical pattern sensor while the main body is rotated one time.

7. The mobile robot according to claim 1, wherein the controller further includes:
   a pattern extraction unit configured to extract a pattern from the data from the optical pattern sensor and to supply the extracted pattern to the obstacle information acquisition unit; and
   a position recognition unit configured to calculate a position of the main body.

8. The mobile robot according to claim 1, wherein the optical pattern sensor includes a pattern irradiation unit emitting a cross-shaped optical pattern, including a horizontal line optical pattern and a vertical line optical pattern orthogonally intersecting the horizontal line optical pattern, to a region around the main body.

9. An operating method of a mobile robot comprising:
   sensing an environment around a main body of the mobile robot through an optical pattern sensor when an operation mode is set;
   generating a plurality of local area maps, each map including information of obstacles located within a designated distance from the main body based on data input from the optical pattern sensor, wherein the plurality of local area maps includes first and second local area maps;
   generating the second local area map according to data input from the optical pattern sensor during traveling from a first area of the first local area map to a second area of the second local area map according to the operation mode; and
   controlling the main body to change a traveling direction so as to avoid an obstacle around the main body based on at least one of the local area maps when the obstacle is sensed,
   wherein the second local area map is generated by retaining data regarding a common area from the first local area map prior to traveling and the second local area map after traveling, adding new data after traveling, and deleting data prior to traveling.

10. The operating method according to claim 9, further including setting a current position of the main body prior to movement as an initial position of 0, when the operation mode is set.

11. The operating method according to claim 10, further including:
    rotating the main body one time at the initial position prior to movement, when the operation mode is set; and
    generating at least one of the local area maps based on data input from the optical pattern sensor while the main body is rotated one time.

12. The operating method according to claim 9, wherein, when the obstacle is sensed, the main body travels so as to avoid the obstacle and simultaneously to avoid other obstacles around the main body based on obstacle information included in at least one of the local area maps.

* * * * *